(12) United States Patent
Huang (10) Patent No.: US 12,229,651 B2
(45) Date of Patent: Feb. 18, 2025

(54) BLOCK-BASED INFERENCE METHOD FOR MEMORY-EFFICIENT CONVOLUTIONAL NEURAL NETWORK IMPLEMENTATION AND SYSTEM THEREOF

(71) Applicant: NATIONAL TSING HUA UNIVERSITY, Hsinchu (TW)

(72) Inventor: Chao-Tsung Huang, Hsinchu (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 731 days.

(21) Appl. No.: 17/064,561

(22) Filed: Oct. 6, 2020

(65) Prior Publication Data

US 2021/0103793 A1 Apr. 8, 2021

Related U.S. Application Data

(60) Provisional application No. 62/912,630, filed on Oct. 8, 2019.

(30) Foreign Application Priority Data

Sep. 4, 2020 (TW) .................................. 109130493

(51) Int. Cl.
*G06N 3/04* (2023.01)
*G06N 5/04* (2023.01)

(52) U.S. Cl.
CPC ............... *G06N 3/04* (2013.01); *G06N 5/04* (2013.01)

(58) Field of Classification Search
CPC ................................... G06N 3/04; G06N 5/04
See application file for complete search history.

(56) References Cited

U.S. PATENT DOCUMENTS

| 2019/0147319 | A1* | 5/2019 | Kim | ............... | G06F 12/023 706/15 |
| 2020/0104690 | A1* | 4/2020 | Bai | ............... | G06F 15/7821 |
| 2021/0192687 | A1* | 6/2021 | Liu | ............... | G06T 3/4046 |

OTHER PUBLICATIONS

Gang Li et.al; Block Convolution: Towards Memory-Efficient Inference of Large Scale CNNs on FPGA, Design, Automation and Test in Europe (Date 2018) (Year: 2018).*

* cited by examiner

*Primary Examiner* — Li B. Zhen
*Assistant Examiner* — Tirumale K Ramesh
(74) *Attorney, Agent, or Firm* — CKC & Partners Co., LLC (57) ABSTRACT

A block-based inference method for a memory-efficient convolutional neural network implementation is performed to process an input image. A block-based inference step is performed to execute a multi-layer convolution operation on each of a plurality of input block data to generate an output block data and includes selecting a plurality of ith layer recomputing features according to a position of the output block data along a scanning line feed direction, and then selecting an ith layer recomputing input feature block data according to the position of the output block data and the ith layer recomputing features, and selecting a plurality of ith layer reusing features according to the ith layer recomputing input feature block data along a block scanning direction, and then combining the ith layer recomputing input feature block data with the ith layer reusing features to generate an ith layer reusing input feature block data.

12 Claims, 10 Drawing Sheets

BLOCK-BASED INFERENCE METHOD FOR MEMORY-EFFICIENT CONVOLUTIONAL NEURAL NETWORK IMPLEMENTATION AND SYSTEM THEREOF

RELATED APPLICATIONS

This application claims priority to U.S. Provisional Application Ser. No. 62/912,630, filed Oct. 8, 2019, and Taiwan Application Ser. No. 109130493, filed Sep. 4, 2020, the disclosures of which are incorporated herein by reference in their entireties.

BACKGROUND

Technical Field

The present disclosure relates to a block-based inference method and a system thereof. More particularly, the present disclosure relates to a block-based inference method for a memory-efficient convolutional neural network implementation and a system thereof.

Description of Related Art

Convolutional neural networks (CNN) recently draw a lot of attention for their great success in computer vision and image processing fields. Their hardware accelerators to enable edge applications also become an emerging need. However, CNN inference for high-performance image processing applications could demand drastically-high DRAM bandwidth and computing power. Recently, two well-known block-based inference flows were proposed to address this issue. One is a feature recomputing, and the other is a feature reusing. In the feature recomputing, the features are recomputed for each block, so that the effective pixel throughput will be lowered. In the feature reusing, the features can be stored in on-chip buffers for reuse, but this approach will require huge line buffers. Therefore, a block-based inference method for a memory-efficient CNN implementation and a system thereof which are capable of providing better tradeoffs between computing and memory overheads are commercially desirable.

SUMMARY

According to one aspect of the present disclosure, a block-based inference method for a memory-efficient convolutional neural network implementation is performed to process an input image. The block-based inference method for the memory-efficient convolutional neural network implementation includes performing a parameter setting step, a dividing step, a block-based inference step and a temporary storing step. The parameter setting step is performed to set an inference parameter group. The inference parameter group includes a depth, a block width, a block height and a plurality of layer kernel sizes. The dividing step is performed to drive a processing unit to divide the input image into a plurality of input block data according to the depth, the block width, the block height and the layer kernel sizes. Each of the input block data has an input block size. The block-based inference step is performed to drive the processing unit to execute a multi-layer convolution operation on each of the input block data to generate an output block data. The multi-layer convolution operation includes performing a first direction data selecting step, a second direction data selecting step and a convolution operation step. The first direction data selecting step is performed to select a plurality of ith layer recomputing features according to a position of the output block data along a scanning line feed direction, and then select an ith layer recomputing input feature block data according to the position of the output block data and the ith layer recomputing features. i is one of a plurality of positive integers from 1 to the depth. The second direction data selecting step is performed to select a plurality of ith layer reusing features according to the ith layer recomputing input feature block data along a block scanning direction, and then combine the ith layer recomputing input feature block data with the ith layer reusing features to generate an ith layer reusing input feature block data. The convolution operation step is performed to select a plurality of ith layer sub-block input feature groups from the ith layer reusing input feature block data according to an ith layer kernel size, and then execute a convolution operation on each of the ith layer sub-block input feature groups and a convolution parameter group to generate each of a plurality of ith layer sub-block output features, and combine the ith layer sub-block output features corresponding to the ith layer sub-block input feature groups to form an ith layer output feature block data. The temporary storing step is performed to drive a block buffer bank to store the ith layer output feature block data and the ith layer reusing features.

According to another aspect of the present disclosure, a block-based inference system for a memory-efficient convolutional neural network implementation is configured to process an input image. The block-based inference system for the memory-efficient convolutional neural network implementation includes a block buffer bank and a processing unit. The block buffer bank is configured to store an ith layer output feature block data and a plurality of ith layer reusing features. The processing unit is electrically connected to the block buffer bank. The processing unit receives the input image and is configured to implement a block-based inference method for the memory-efficient convolutional neural network implementation including performing a parameter setting step, a dividing step and a block-based inference step. The parameter setting step is performed to set an inference parameter group. The inference parameter group includes a depth, a block width, a block height and a plurality of layer kernel sizes. The dividing step is performed to divide the input image into a plurality of input block data according to the depth, the block width, the block height and the layer kernel sizes. Each of the input block data has an input block size. The block-based inference step is performed to execute a multi-layer convolution operation on each of the input block data to generate an output block data. The multi-layer convolution operation includes performing a first direction data selecting step, a second direction data selecting step and a convolution operation step. The first direction data selecting step is performed to select a plurality of ith layer recomputing features according to a position of the output block data along a scanning line feed direction, and then select an ith layer recomputing input feature block data according to the position of the output block data and the ith layer recomputing features. i is one of a plurality of positive integers from 1 to the depth. The second direction data selecting step is performed to select the ith layer reusing features according to the ith layer recomputing input feature block data along a block scanning direction, and then combine the ith layer recomputing input feature block data with the ith layer reusing features to generate an ith layer reusing input feature block data. The convolution operation step is performed to select a plurality of ith layer sub-block input feature groups from the ith layer reusing input feature block data according to an ith layer kernel size, and then execute a convolution operation on each of the ith layer sub-block input feature groups and a convolution parameter group to generate each of a plurality of ith layer sub-block output features, and combine the ith layer sub-block output features corresponding to the ith layer sub-block input feature groups to form the ith layer output feature block data.

BRIEF DESCRIPTION OF THE DRAWINGS

The present disclosure can be more fully understood by reading the following detailed description of the embodiment, with reference made to the accompanying drawings as follows.

DETAILED DESCRIPTION

The embodiment will be described with the drawings. For clarity, some practical details will be described below. However, it should be noted that the present disclosure should not be limited by the practical details, that is, in some embodiment, the practical details is unnecessary. In addition, for simplifying the drawings, some conventional structures and elements will be simply illustrated, and repeated elements may be represented by the same labels.

It will be understood that when an element (or device) is referred to as be "connected to" another element, it can be directly connected to the other element, or it can be indirectly connected to the other element, that is, intervening elements may be present. In contrast, when an element is referred to as be "directly connected to" another element, there are no intervening elements present. In addition, the terms first, second, third, etc. are used herein to describe various elements or components, these elements or components should not be limited by these terms. Consequently, a first element or component discussed below could be termed a second element or component.

Figure 1:
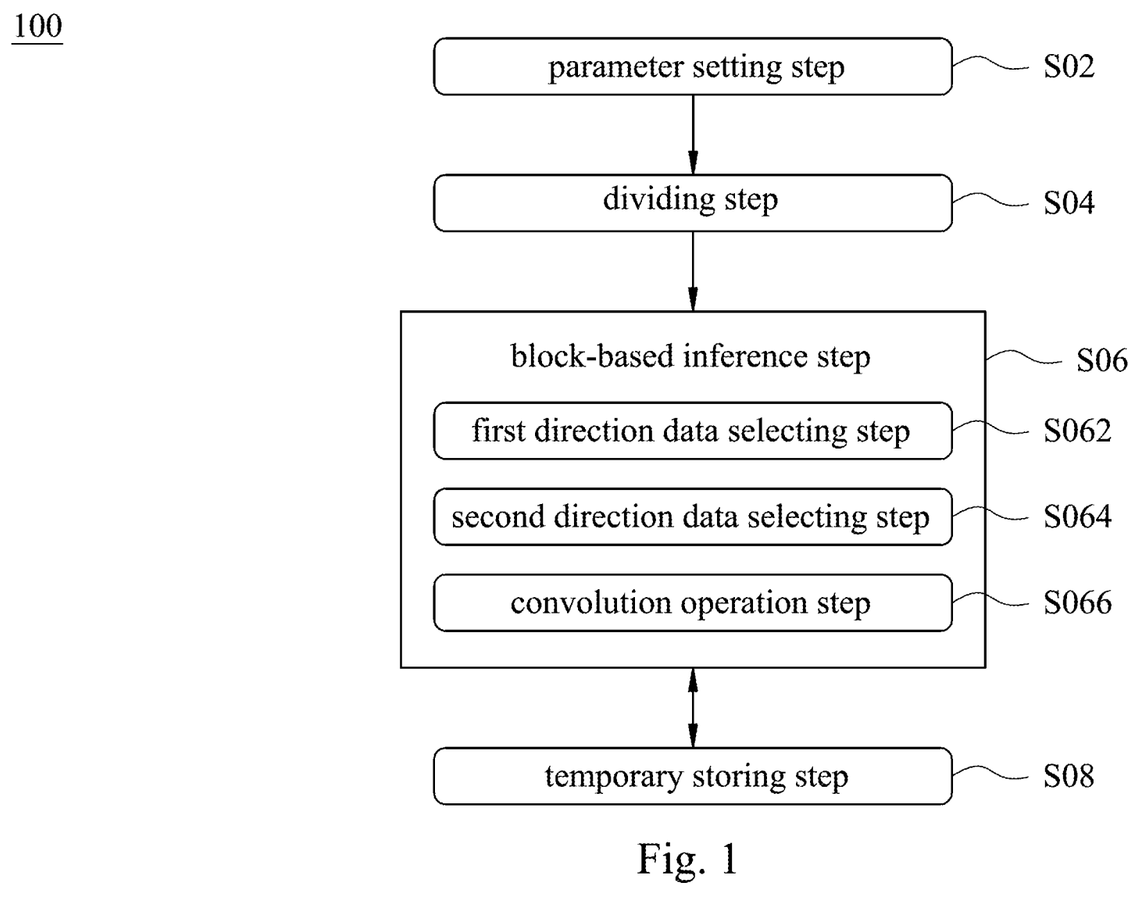
FIG. 1 shows a flow chart of a block-based inference method for a memory-efficient convolutional neural network implementation according to a first embodiment of the present disclosure.

FIG. 1 shows a flow chart of a block-based inference method 100 for a memory-efficient convolutional neural network (CNN) implementation according to a first embodiment of the present disclosure. The block-based inference method 100 for the memory-efficient CNN implementation is performed to process an input image and generate an output image. The block-based inference method 100 includes performing a parameter setting step S02, a dividing step S04, a block-based inference step S06 and a temporary storing step S08.

The parameter setting step S02 is performed to set an inference parameter group. The inference parameter group includes a depth, a block width, a block height and a plurality of layer kernel sizes. A layer number of the layer kernel sizes is equal to the depth.

The dividing step S04 is performed to drive a processing unit to divide the input image into a plurality of input block data according to the depth, the block width, the block height and the layer kernel sizes. Each of the input block data has an input block size.

The block-based inference step S06 is performed to drive the processing unit to execute a multi-layer convolution operation on each of the input block data to generate an output block data. The multi-layer convolution operation includes performing a first direction data selecting step S062, a second direction data selecting step S064 and a convolution operation step S066. The first direction data selecting step S062 is performed to select a plurality of ith layer recomputing features according to a position of the output block data along a scanning line feed direction, and then select an ith layer recomputing input feature block data according to the position of the output block data and the ith layer recomputing features. i is one of a plurality of positive integers from 1 to the depth. In addition, the second direction data selecting step S064 is performed to select a plurality of ith layer reusing features according to the ith layer recomputing input feature block data along a block scanning direction, and then combine the ith layer recomputing input feature block data with the ith layer reusing features to generate an ith layer reusing input feature block data. The convolution operation step S066 is performed to select a plurality of ith layer sub-block input feature groups from the ith layer reusing input feature block data according to an ith layer kernel size, and then execute a convolution operation on each of the ith layer sub-block input feature groups and a convolution parameter group to generate each of a plurality of ith layer sub-block output features, and combine the ith layer sub-block output features corresponding to the ith layer sub-block input feature groups to form an ith layer output feature block data. The convolution parameter group includes a weight parameter and a bias parameter.

The temporary storing step S08 is performed to drive a block buffer bank to store the ith layer output feature block data and the ith layer reusing features.

Therefore, the block-based inference method 100 for the memory-efficient CNN implementation of the present disclosure reuses the features along the block scanning direction to reduce recomputing overheads and recomputes the features between different scan lines to eliminate the global line buffer, so that the inference flow of the present disclosure can provide great flexibility and good tradeoffs between computing and memory overheads for high-performance and memory-efficient CNN inference. Each of the steps of the block-based inference method 100 is described in more detail below.

Figure 2:
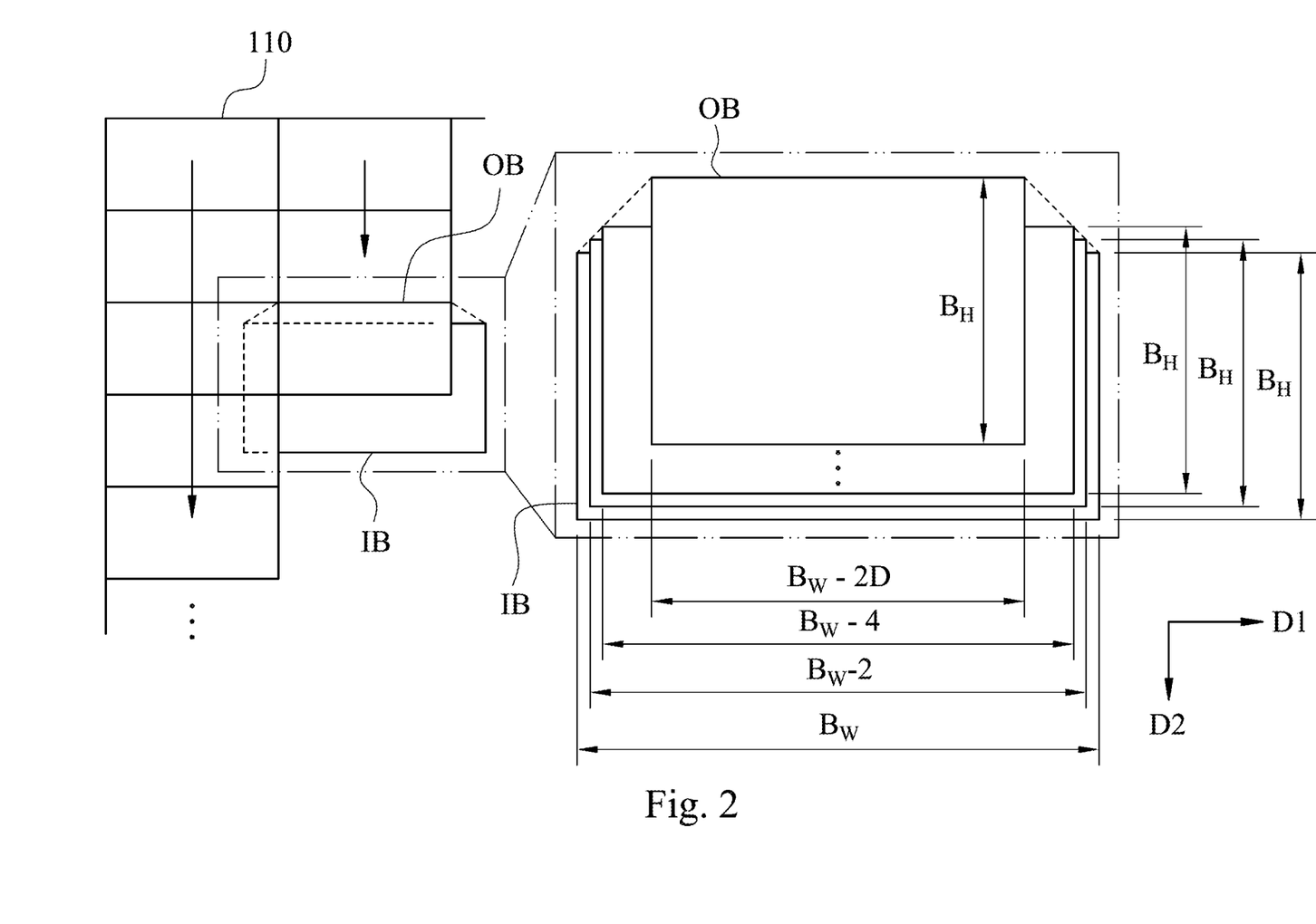
FIG. 2 shows a schematic view of a dividing step of the block-based inference method of FIG. 1.
Figure 3:
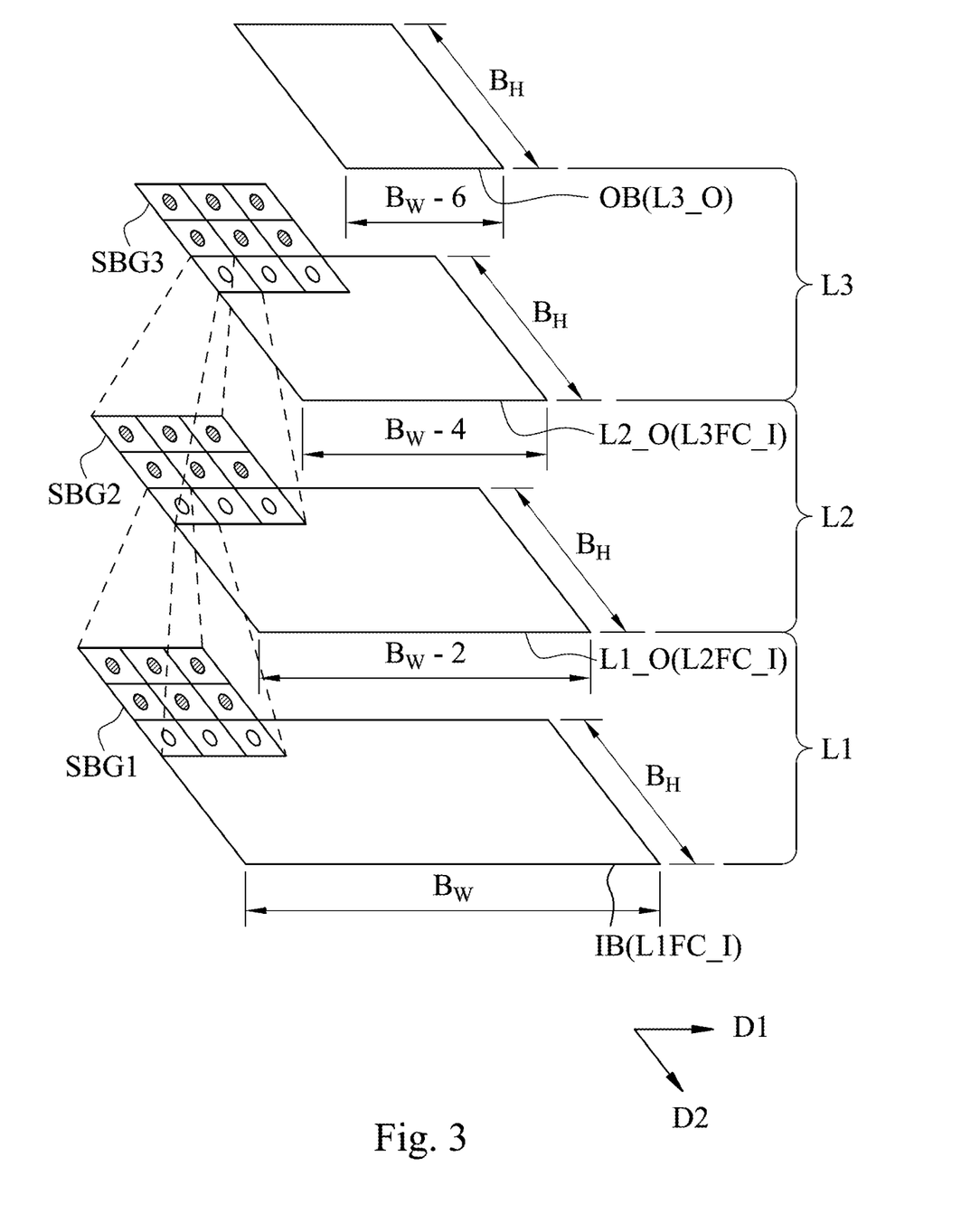
FIG. 3 shows a schematic view of a three-dimensional structure of an input block data and an output block data of a multi-layer convolution operation of a block-based inference step of the block-based inference method of FIG. 1.
Figure 4:
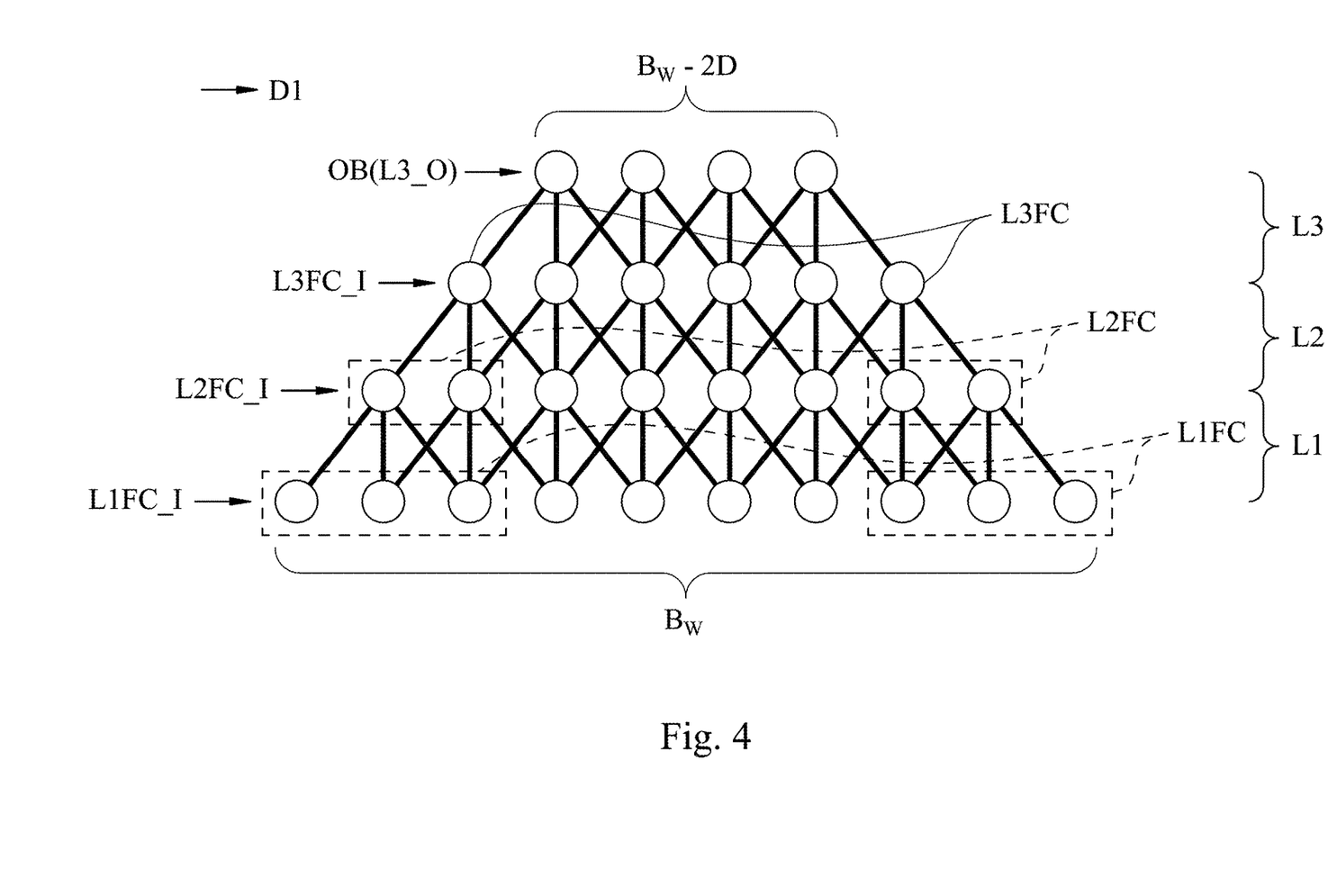
FIG. 4 shows a schematic view of a first direction data selecting step of the block-based inference method of FIG. 1.
Figure 5:
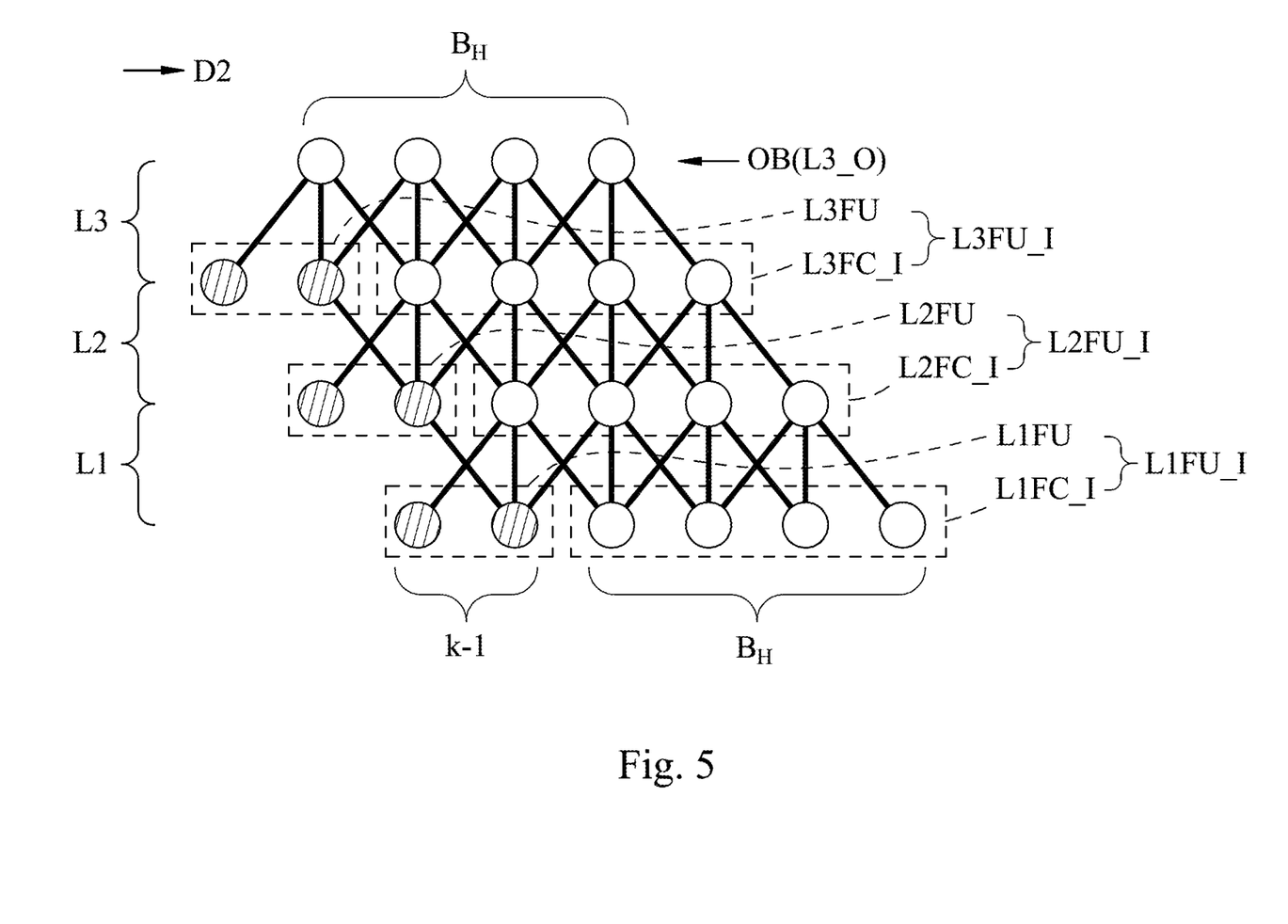
FIG. 5 shows a schematic view of a second direction data selecting step of the block-based inference method of FIG. 1.
Figure 6:
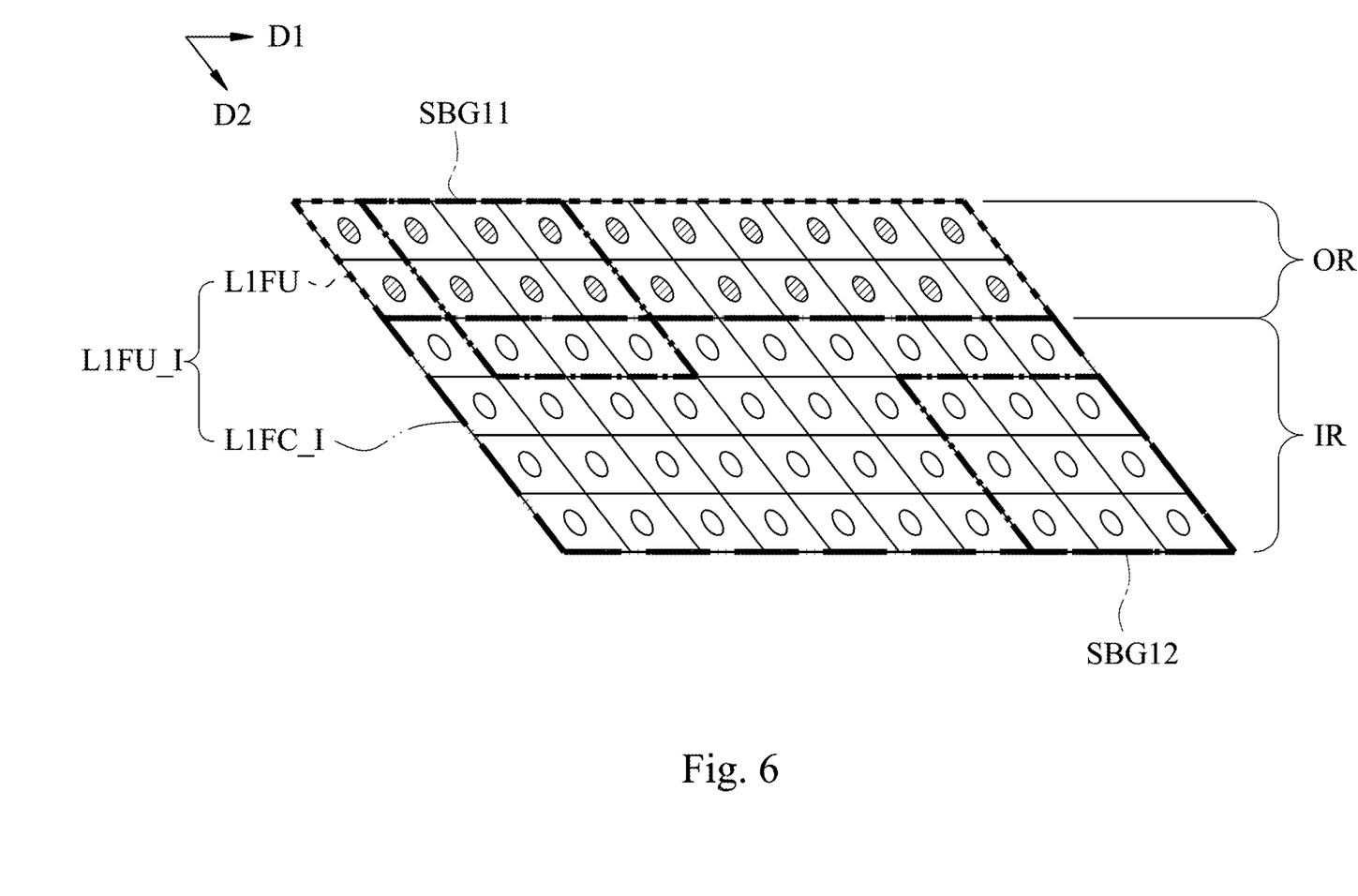
FIG. 6 shows a schematic view of a first layer reusing input feature block data of FIG. 3.

Please refer to FIGS. 1-6. FIG. 2 shows a schematic view of a dividing step S04 of the block-based inference method 100 of FIG. 1. FIG. 3 shows a schematic view of a three-dimensional structure of an input block data IB and an output block data OB of a multi-layer convolution operation of a block-based inference step S06 of the block-based inference method 100 of FIG. 1. FIG. 4 shows a schematic view of a first direction data selecting step S062 of the block-based inference method 100 of FIG. 1. FIG. 5 shows a schematic view of a second direction data selecting step S064 of the block-based inference method 100 of FIG. 1. FIG. 6 shows a schematic view of a first layer reusing input feature block data L1FU_I of FIG. 3. In the embodiment, the first direction data selecting step S062, the second direction data selecting step S064 and the convolution operation step S066 are performed in each layer (i.e., i of the ith layer is equal to each of 1-D). The depth D, the block width $B_W$ and the block height $B_H$ are all positive integers. The ith layer kernel size is $k_{Wi} \times k_{Hi}$, and $k_{Wi}$ and $k_{Hi}$ are both positive integers. The scanning line feed direction D1 is a horizontal direction. The block scanning direction D2 is a vertical direction. In other words, the block scanning direction D2 is perpendicular to the scanning line feed direction D1. The block width $B_W$ is greater than the block height $B_H$, and an extending direction of the block height $B_H$ is parallel to the block scanning direction D2. The input block size is equal to $B_W \times B_H$. The output block data OB has an output block size, and the output block size is equal to $(B_W-2D) \times B_H$. The ith layer recomputing input feature block data has an ith layer recomputing input feature block size, and the ith layer recomputing input feature block size is equal to $(B_W-2i+2) \times B_H$. The ith layer reusing input feature block data has an ith layer reusing input feature block size, and the ith layer reusing input feature block size is equal to $(B_W-2i+2) \times (B_H+2)$. The ith layer output feature block data has an ith layer output feature block size, and the ith layer output feature block size is equal to $(B_W-2i) \times B_H$. The ith layer output feature block data represents the output feature in the ith layer after performing the convolution operation and is used for feature-recomputing in the next layer (i.e., the i+1th layer) of the same block. The depth D is less than a half of the block width $B_W$. Moreover, the ith layer reusing features have a reusing feature number along the block scanning direction D2, and the reusing feature number is equal to $k_{Hi}-1$ (i.e., k-1). The ith layer reusing features are used for feature-reusing in the same layer (i.e., the ith layer) of the next block. In response to determining that i is equal to 1, the ith layer recomputing input feature block data is equal to each of the input block data IB. In response to determining that i is equal to the depth D, the ith layer output feature block data is equal to the output block data OB.

In FIGS. 3-6, the depth D is 3. The block width $B_W$ is 10, and the block height $B_H$ is 4. The ith layer kernel size is 3×3, that is $k_{Wi}=k_{Hi}=k$, and $k_{Wi}$ and $k_{Hi}$ are both 3. 3 of the depth D represents that there is a 3-layer convolution operation in one block, so that the multi-layer convolution operation includes a first layer convolution operation, a second layer convolution operation and a third layer convolution operation (i.e., i=1, 2 and 3).

The first layer convolution operation (i=1) includes the first direction data selecting step S062, the second direction data selecting step S064 and the convolution operation step S066. The first direction data selecting step S062 is performed to select six first layer recomputing features L1FC (i.e., the number of the first layer recomputing features is (D-i+1)×(k-1), where D=k=3, and i=1) according to the position of the output block data OB (i.e., a third layer output feature block data L3_O) along the scanning line feed direction D1, and then select a first layer recomputing input feature block data L1FC_I according to the position of the output block data OB and the first layer recomputing features L1FC. The first layer recomputing input feature block data L1FC_I is equal to the input block data IB. The input block size of the input block data IB is equal to a first layer recomputing input feature block size of the first layer recomputing input feature block data L1FC_I, that is $(B_W-2i+2) \times B_H = (10-2+2) \times 4 = 10 \times 4$, such as a first layer L1 shown in FIGS. 3 and 4 and the structure shown in FIG. 6. In addition, the second direction data selecting step S064 is performed to select two first layer reusing features L1FU according to the first layer recomputing input feature block data L1FC_I along the block scanning direction D2, and then combine the first layer recomputing input feature block data L1FC_I with the first layer reusing features L1FU to generate a first layer reusing input feature block data L1FU_I. A first layer reusing input feature block size of the first layer reusing input feature block data L1FU_I is equal to $(B_W-2i+2) \times (B_H+2) = (10-2+2) \times (4+2) = 10 \times 6$, such as the first layer L1 shown in FIGS. 3 and 5 and the structure shown in FIG. 6. Moreover, the convolution operation step S066 is performed to select a plurality of first layer sub-block input feature groups SBG1 (i.e., 3×3 features) from the first layer reusing input feature block data L1FU_I according to the ith layer kernel size (i.e., 3×3), and then execute a convolution operation on each of the first layer sub-block input feature groups SBG1 and the convolution parameter group to generate each of a plurality of first layer sub-block output features, and combine the first layer sub-block output features corresponding to the first layer sub-block input feature groups SBG1 to form a first layer output feature block data L1_O. A first layer output feature block size of the first layer output feature block data L1_O is equal to $(B_W-2i) \times B_H = (10-2) \times 4 = 8 \times 4$, such as the first layer L1 shown in FIGS. 3 and 5.

The second layer convolution operation (i=2) includes the first direction data selecting step S062, the second direction data selecting step S064 and the convolution operation step S066. The first direction data selecting step S062 is performed to select four second layer recomputing features L2FC (i.e., the number of the second layer recomputing features is (D-i+1)×(k-1), where D=k=3, and i=2) according to the position of the output block data OB (i.e., the third layer output feature block data L3_O) along the scanning line feed direction D1, and then select a second layer recomputing input feature block data L2FC_I according to the position of the output block data OB and the second layer recomputing features L2FC. The second layer recomputing input feature block data L2FC_I is equal to the first layer output feature block data L1_O. A second layer recomputing input feature block size of the second layer recomputing input feature block data L2FC_I is equal to $(B_W-2i+2) \times B_H = (10-4+2) \times 4 = 8 \times 4$, such as a second layer L2 shown in FIGS. 3 and 4. In addition, the second direction data selecting step S064 is performed to select two second layer reusing features L2FU according to the second layer recomputing input feature block data L2FC_I along the block scanning direction D2, and then combine the second layer recomputing input feature block data L2FC_I with the second layer reusing features L2FU to generate a second layer reusing input feature block data L2FU_I. A second layer reusing input feature block size of the second layer reusing input feature block data L2FU_I is equal to $(B_W-2i+2) \times (B_H+2) = (10-4+2) \times (4+2) = 8 \times 6$, such as the second layer L2 shown in FIGS. 3 and 5. Moreover, the convolution operation step S066 is performed to select a plurality of second layer sub-block input feature groups SBG2 (i.e., 3×3 features) from the second layer reusing input feature block data L2FU_I according to the ith layer kernel size (i.e., 3×3), and then execute the convolution operation on each of the second layer sub-block input feature groups SBG2 and the convolution parameter group to generate each of a plurality of second layer sub-block output features, and combine the second layer sub-block output features corresponding to the second layer sub-block input feature groups SBG2 to form a second layer output feature block data L2_O. A second layer output feature block size of the second layer output feature block data L2_O is equal to $(B_W-2i) \times B_H = (10-4) \times 4 = 6 \times 4$, such as the second layer L2 shown in FIGS. 3 and 5.

The third layer convolution operation (i=3) includes the first direction data selecting step S062, the second direction data selecting step S064 and the convolution operation step S066. The first direction data selecting step S062 is performed to select two third layer recomputing features L3FC (i.e., the number of the third layer recomputing features is $(D-i+1) \times (k-1)$, where D=k=3) according to the position of the output block data OB (i.e., the third layer output feature block data L3_O) along the scanning line feed direction D1, and then select a third layer recomputing input feature block data L3FC_I according to the position of the output block data OB and the third layer recomputing features L3FC. The third layer recomputing input feature block data L3FC_I is equal to the second layer output feature block data L2_O. A third layer recomputing input feature block size of the third layer recomputing input feature block data L3FC_I is equal to $(B_W-2i+2) \times B_H = (10-6+2) \times 4 = 6 \times 4$, such as a third layer L3 shown in FIGS. 3 and 4. In addition, the second direction data selecting step S064 is performed to select two third layer reusing features L3FU according to the third layer recomputing input feature block data L3FC_I along the block scanning direction D2, and then combine the third layer recomputing input feature block data L3FC_I with the third layer reusing features L3FU to generate a third layer reusing input feature block data L3FU_I. A third layer reusing input feature block size of the third layer reusing input feature block data L3FU_I is equal to $(B_W-2i+2) \times (B_H+2) = (10-6+2) \times (4+2) = 6 \times 6$, such as the third layer L3 shown in FIGS. 3 and 5. Moreover, the convolution operation step S066 is performed to select a plurality of third layer sub-block input feature groups SBG3 (i.e., 3×3 features) from the third layer reusing input feature block data L3FU_I according to the ith layer kernel size (i.e., 3×3), and then execute the convolution operation on each of the third layer sub-block input feature groups SBG3 and the convolution parameter group to generate each of a plurality of third layer sub-block output features, and combine the third layer sub-block output features corresponding to the third layer sub-block input feature groups SBG3 to form the third layer output feature block data L3_O. The third layer output feature block data L3_O is equal to the output block data OB. A third layer output feature block size of the third layer output feature block data L3_O is equal to $(B_W-2i) \times B_H = (10-6) \times 4 = 4 \times 4$. The output block size of the output block data OB is equal to $(B_W-2D) \times B_H = (10-6) \times 4 = 4 \times 4$, such as the third layer L3 shown in FIGS. 3 and 5.

In the block-based inference method 100 for the memory-efficient CNN implementation of the present disclosure, in response to determining that at least one of a plurality of input features of one of the ith layer sub-block input feature groups is located in an outer region of the ith layer reusing input feature block data, the input features of the one of the ith layer sub-block input feature groups include a plurality of outer block features and a plurality of first inner block features. The outer block features represent the input features that have been calculated by the convolution operation, and the first inner block features represent the input features that have not been calculated by the convolution operation. On the other hand, in response to determining that the input features of the one of the ith layer sub-block input feature groups are all located in an inner region of the ith layer reusing input feature block data, the input features of the one of the ith layer sub-block input feature groups only include a plurality of second inner block features, and the second inner block features represent the input features that have not been calculated by the convolution operation. The ith layer reusing input feature block data has the outer region and the inner region in sequence along the block scanning direction D2. For example, in FIG. 6, in response to determining that six of nine input features of the first layer sub-block input feature group SBG11 is located in the outer region OR of the first layer reusing input feature block data L1FU_I, the nine input features of the first layer sub-block input feature group SBG11 include six outer block features and three first inner block features. The six outer block features represent the input features that have been calculated by the convolution operation and are located in the outer region OR. The three first inner block features represent the input features that have not been calculated by the convolution operation and are located in the inner region IR. On the other hand, in response to determining that the nine input features of the first layer sub-block input feature group SBG12 are all located in the inner region IR of the first layer reusing input feature block data L1FU_I, the nine input features of the first layer sub-block input feature group SBG12 only include nine second inner block features, and the nine second inner block features represent the input features that have not been calculated by the convolution operation. The first layer reusing input feature block data L1FU_I has the outer region OR and the inner region IR in sequence along the block scanning direction D2.

In the temporary storing step S08, the bottom $k_{Hi}-1$ rows of the ith layer recomputing input feature block data LiFC_I are stored in the block buffer bank to be used in the next block and become the ith layer reusing features LiFU of the next block. For example, after performing the first layer convolution operation of the block-based inference step S06, the temporary storing step S08 is performed, and the bottom $k_{Hi}-1$ (e.g., $k_{Hi}-1=2$) rows of the first layer recomputing input feature block data L1FC_I of the current block are stored in the block buffer bank to be used in the next block and become the first layer reusing features L1FU of the next block. After performing the second layer convolution operation of the block-based inference step S06, the temporary storing step S08 is performed, and the bottom $k_{Hi}-1$ rows of the second layer recomputing input feature block data L2FC_I of the current block are stored in the block buffer bank to be used in the next block and become the second layer reusing features L2FU of the next block. After performing the third layer convolution operation of the block-based inference step S06, the temporary storing step S08 is performed, and the bottom $k_{Hi}-1$ rows of the third layer recomputing input feature block data L3FC_I of the current block are stored in the block buffer bank to be used in the next block and become the third layer reusing features L3FU of the next block. Therefore, the amount of calculation can be greatly reduced.

Figure 7:
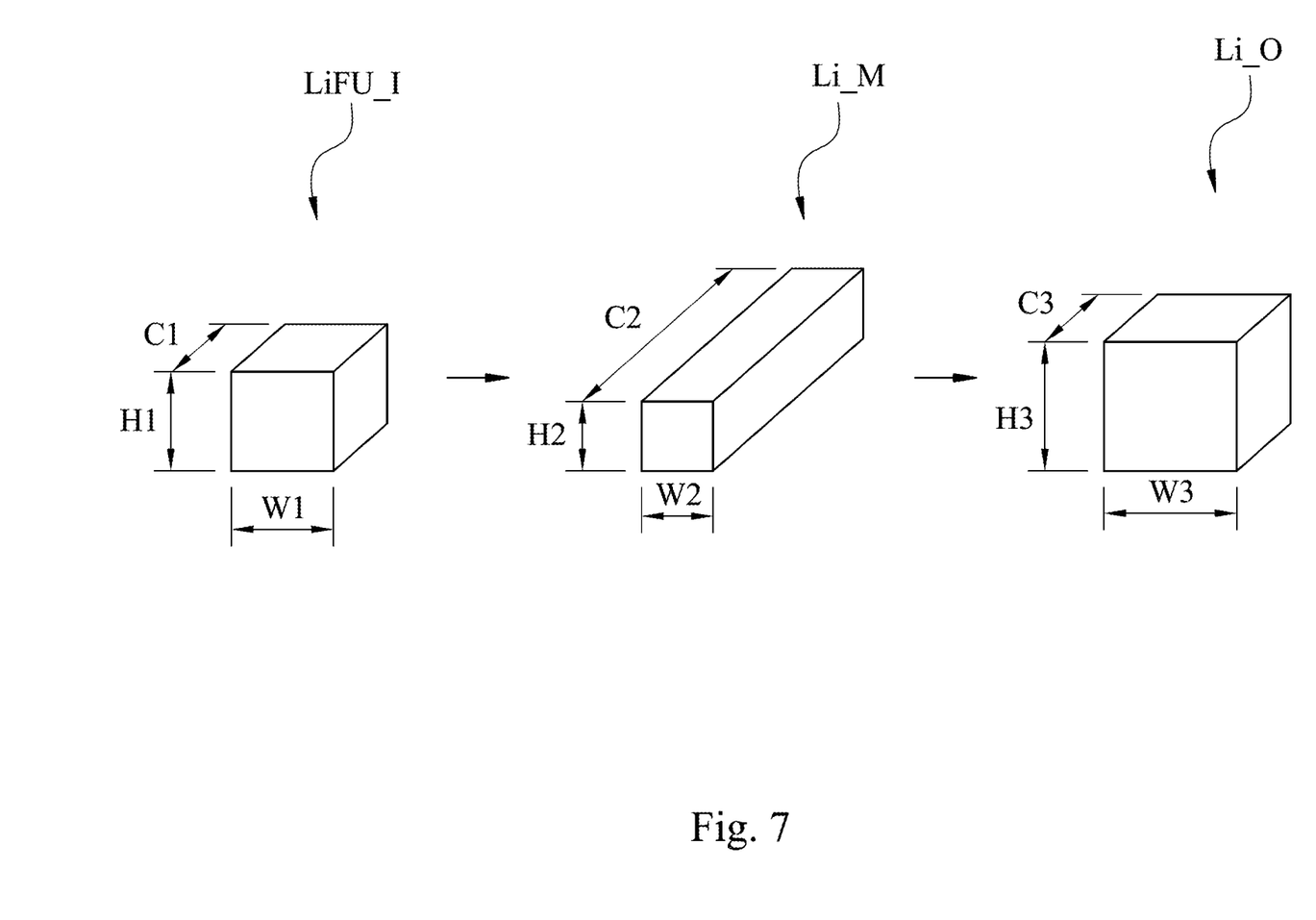
FIG. 7 shows a schematic view of a channel shuffle according to a second embodiment of the present disclosure.

Please refer to FIGS. 1-7. FIG. 7 shows a schematic view of a channel shuffle according to a second embodiment of the present disclosure. The block-based inference method 100 of the present disclosure can be applied to the channel shuffle. The ith layer reusing input feature block data LiFU_I has an ith layer reusing input feature block size W1×H1 and an ith layer reusing input feature block channel number C1. The ith layer intermediate feature block data Li_M has an ith layer intermediate feature block size W2×H2 and an ith layer intermediate feature block channel number C2. The ith layer output feature block data Li_O has an ith layer output feature block size W3×H3 and an ith layer output feature block channel number C3. The ith layer output feature block size W3×H3 is greater than the ith layer reusing input feature block size W1×H1. The ith layer reusing input feature block size W1×H1 is greater than the ith layer intermediate feature block size W2×H2. W1, W2 and W3 are the block widths. H1, H2 and H3 are the block heights. In addition, the ith layer reusing input feature block channel number C1 is equal to the ith layer output feature block channel number C3. The ith layer intermediate feature block channel number C2 is greater than the ith layer reusing input feature block channel number C1. For example, the ith layer reusing input feature block size W1×H1, the ith layer intermediate feature block size W2×H2 and the ith layer output feature block size W3×H3 are 10×10, 8×8 and 16×16, respectively. The ith layer reusing input feature block channel number C1, the ith layer intermediate feature block channel number C2 and the ith layer output feature block channel number C3 are 32, 128 and 32, respectively, but the present disclosure is not limited thereto.

Therefore, the present disclosure can realize a specific multi-layer convolution operation by reusing the features along the block scanning direction D2 to reduce recomputing overheads and recomputing the features along the scanning line feed direction D1 to eliminate the block buffer bank, so that the inference flow of the present disclosure can provide great flexibility and good tradeoffs between computing and memory overheads for high-performance and memory-efficient CNN inference.

Figure 8:
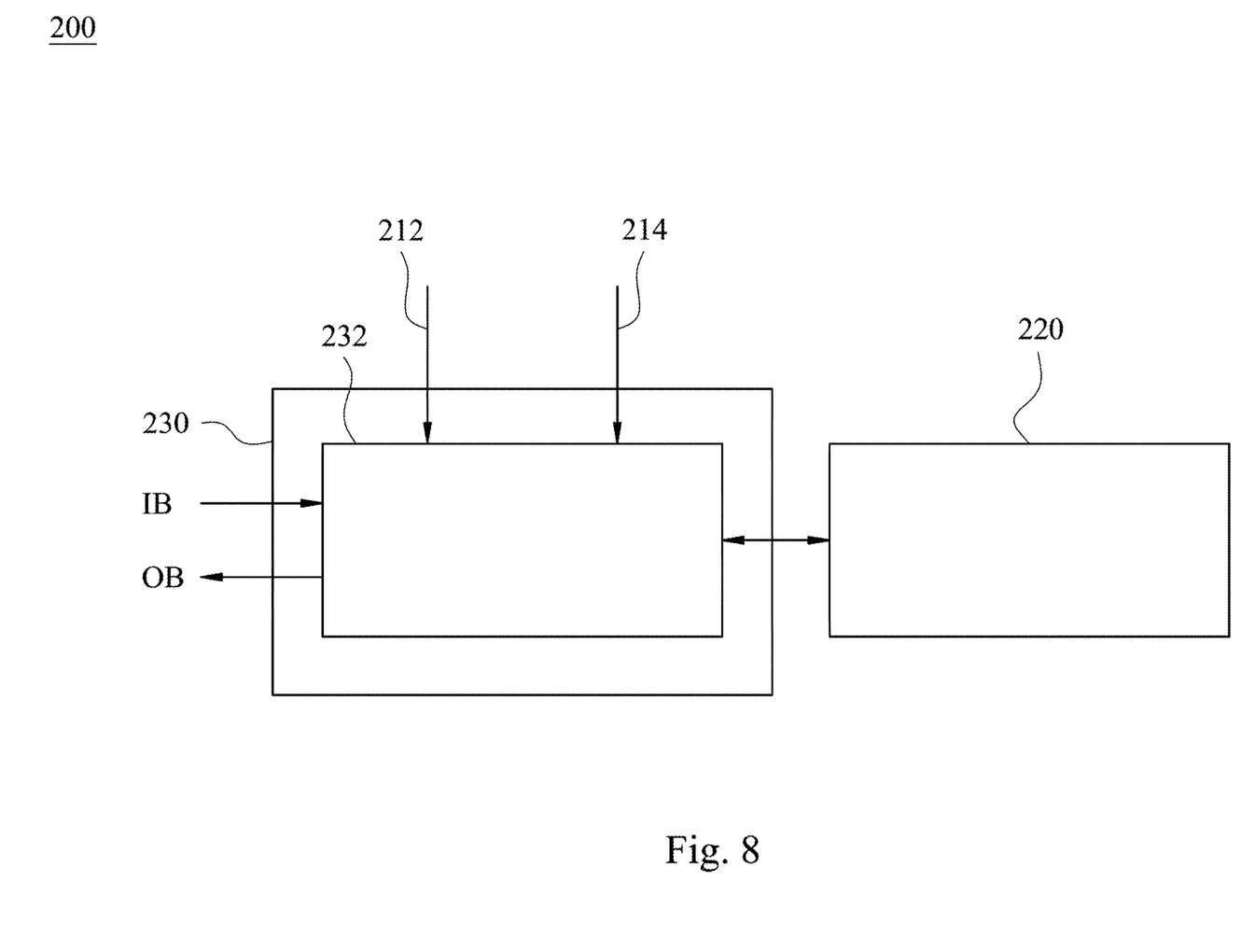
FIG. 8 shows a block diagram of a block-based inference system for a memory-efficient convolutional neural network implementation according to a third embodiment of the present disclosure.
Figure 9:
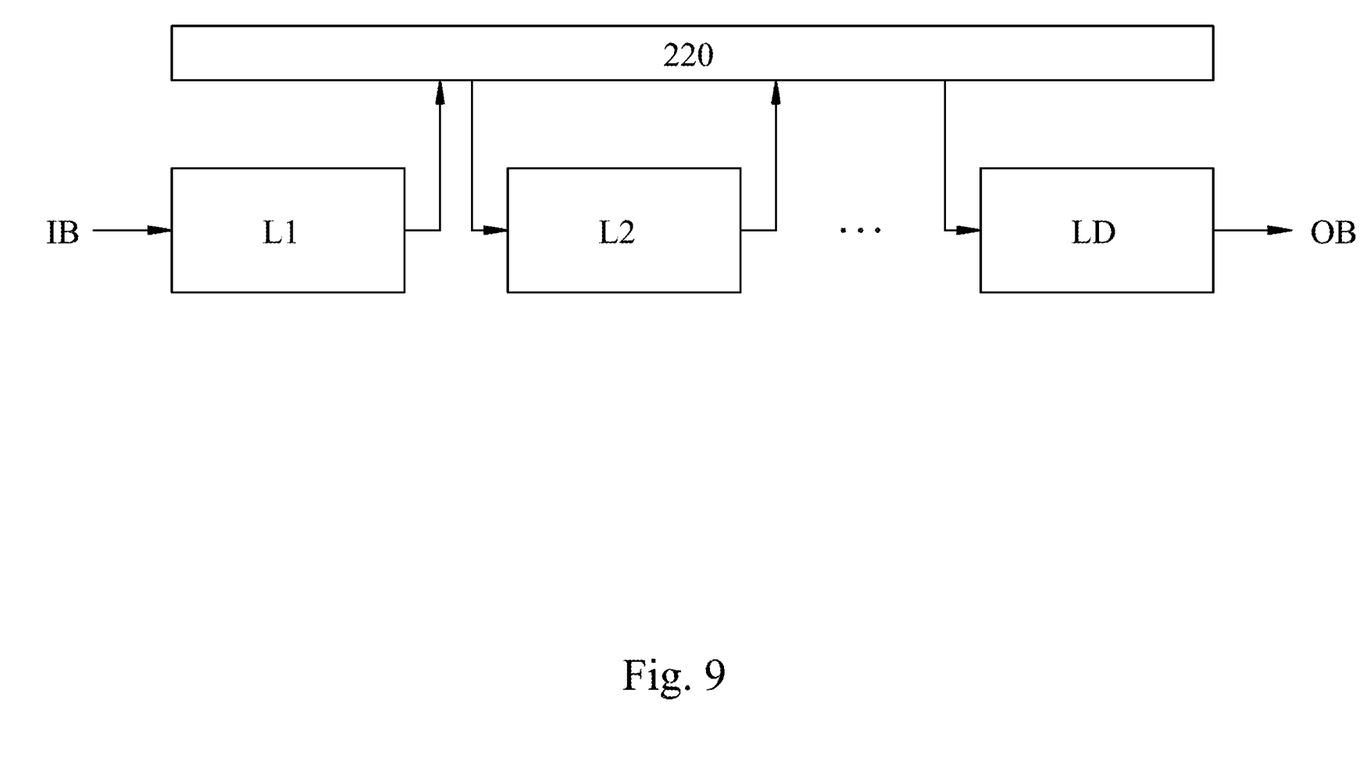
FIG. 9 shows a flow chart of a multi-layer convolution operation with a 3×3 filter according to a fourth embodiment of the present disclosure.

Please refer to FIGS. 1, 2, 8 and 9. FIG. 8 shows a block diagram of a block-based inference system 200 for a memory-efficient CNN implementation according to a third embodiment of the present disclosure. FIG. 9 shows a flow chart of a multi-layer convolution operation with a 3×3 filter according to a fourth embodiment of the present disclosure. The block-based inference system 200 for the memory-efficient CNN implementation is configured to process an input image and generate an output image 110. The block-based inference system 200 includes a block buffer bank 220 and a processing unit 230. The input block data IB, the inference parameter group 212 and the convolution parameter group 214 are inputted to the processing unit 230. The output block data OB is outputted to form the output image 110. The block buffer bank 220 is configured to store an ith layer output feature block data and a plurality of ith layer reusing features. The two types of temporary storage utilize different locations in the block buffer bank 220. In addition, the processing unit 230 is electrically connected to the block buffer bank 220. The processing unit 230 receives the input image and is configured to implement the block-based inference method 100 for the memory-efficient CNN implementation of FIG. 1. The processing unit 230 includes a convolution engine 232 configured to perform the convolution operation. The processing unit 230 may be a microprocessor, a central processing unit or an image processor, but the present disclosure is not limited thereto. L1, L2 and LD represent a first layer, a second layer and a Dth layer, respectively. The first layer L1 to the Dth layer LD are all operated by the convolution engine 232 of the processing unit 230. Moreover, the outer block features may be stored in the block buffer bank 220. The block buffer bank 220 has a temporary storage space, and the temporary storage space can be calculated according to a width $B_{Wi}$ of the ith layer recomputing input feature block data, a depth D, a layer number i, a channel number C and the ith layer kernel size $k_{Wi} \times k_{Hi}$. The temporary storage space is represented as LBS and described as follows:

$$LBS = \Sigma_{i=1}^{D}(k_{Hi}-1) \cdot B_{Wi} \cdot C \qquad (1)$$

For example, if the first direction data selecting step S062, the second direction data selecting step S064 and the convolution operation step S066 are performed in each layer (i.e., i of the ith layer is equal to each of 1–D), and $k_{Wi} = k_{Hi} = k = 3$, the temporary storage space can be described as follows:

$$LBS = 2 \cdot \Sigma_{i=1}^{D}(B_{W}-2i) \cdot C = 2(B_{W}-D+1) \cdot D \cdot C \qquad (2).$$

Therefore, the block-based inference system 200 for the memory-efficient CNN implementation of the present disclosure reuses the features along the block scanning direction D2 to reduce recomputing overheads and recomputes the features between different scan lines to eliminate the block buffer bank 220, so that the inference flow of the present disclosure can provide great flexibility and good tradeoffs between computing and memory overheads for high-performance and memory-efficient CNN inference.

Figure 10:
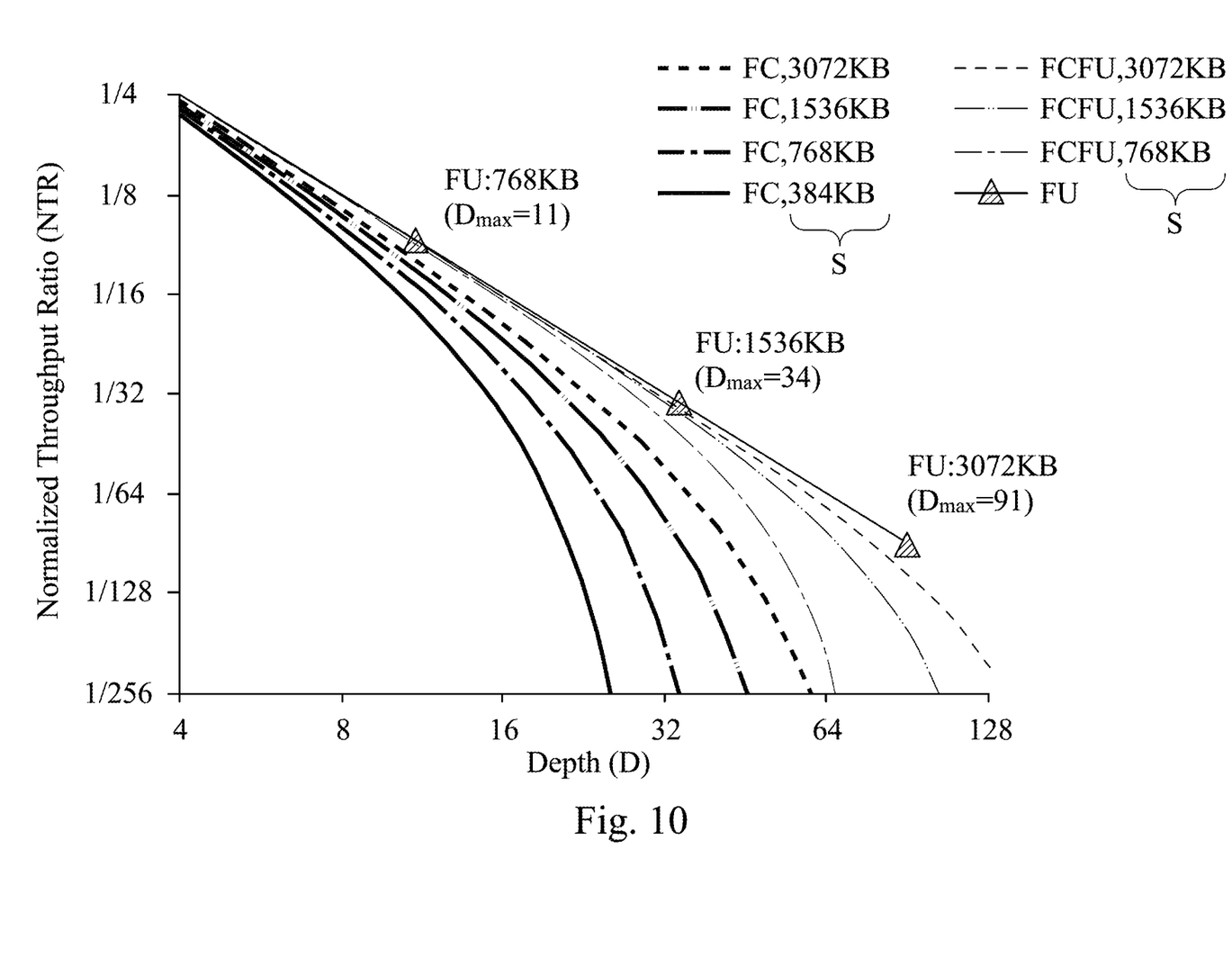
FIG. 10 shows a schematic view of a comparison result of a feature-recomputing of a first conventional technique, a feature-reusing of a second conventional technique and a feature-recomputing feature-reusing of the present disclosure.

Please refer to FIGS. 1 and 10. FIG. 10 shows a schematic view of a comparison result of a feature-recomputing (FC) of a first conventional technique, a feature-reusing (FU) of a second conventional technique and a feature-recomputing feature-reusing (FCFU) of the present disclosure. The plain network configurations include the conditions that the product value A is set to $64^2$, the resolution of the output image 110 is 960×540, and $k_{Wi} = k_{Hi} = k$. The product value A is a minimum value of the block width $B_W$ multiplied by the block height $B_H$. The multi-layer convolution operation of the present disclosure has a normalized throughput ratio NTR, and the normalized throughput ratio NTR is obtained by calculating the depth D and a normalized computing ratio NCR. The normalized computing ratio NCR is obtained by calculating the block width $B_W$, the block height $B_H$, the depth D and a variable h. The normalized throughput ratio NTR and the normalized computing ratio NCR can be respectively described as follows:

$$NTR = \frac{1}{D} \times \frac{1}{NCR}. \qquad (3)$$

$$NCR = \frac{\int_0^D (B_W - 2D + 2h) B_H dh}{(B_W - 2D) B_H} = 1 + \frac{D}{B_W - 2D}. \qquad (4)$$

In FIG. 10, if the block buffer bank 220 has a plurality of block buffer size limits S, the supported model depths $D_{max}$ of the FU flow with the block buffer size limits S are the shallowest among the three flows. On the contrary, the FC flow supports wide ranges of model depths, but the normalized throughput ratio NTR are degraded seriously due to its high recomputing overheads. Therefore, the FCFU flow of the present disclosure not only supports wider depth ranges than the FU flow but also delivers the better normalized throughput ratio NTR than the FC flow.

According to the aforementioned embodiments and examples, the advantages of the present disclosure are described as follows.

1. The block-based inference method for the memory-efficient CNN implementation of the present disclosure reuses the features along the block scanning direction to reduce recomputing overheads and recomputes the features between different scan lines to eliminate the global line buffer, so that the inference flow of the present disclosure can provide great flexibility and good tradeoffs between computing and memory overheads for high-performance and memory-efficient CNN inference.

2. The block-based inference system for the memory-efficient CNN implementation of the present disclosure reuses the features along the block scanning direction to reduce recomputing overheads and recomputes the features between different scan lines to eliminate the block buffer bank, so that the inference flow of the present disclosure can provide great flexibility and good tradeoffs between computing and memory overheads for high-performance and memory-efficient CNN inference.

3. The FCFU flow of the present disclosure not only supports wider depth ranges than the FU flow but also delivers the better normalized throughput ratio than the FC flow.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A block-based inference method for a memory-efficient convolutional neural network implementation, which is performed to process an input image, and the block-based inference method for the memory-efficient convolutional neural network implementation comprising:

performing a parameter setting step to set an inference parameter group, wherein the inference parameter group comprises a depth, a block width, a block height and a plurality of layer kernel sizes;

performing a dividing step to drive a processing unit to divide the input image into a plurality of input block data according to the depth, the block width, the block height and the layer kernel sizes, wherein each of the input block data has an input block size;

performing a block-based inference step to drive the processing unit to execute a multi-layer convolution operation on each of the input block data to generate an output block data, wherein the multi-layer convolution operation comprises:

performing a first direction data selecting step to select a plurality of ith layer recomputing features according to a position of the output block data along a scanning line feed direction, and then select an ith layer recomputing input feature block data according to the position of the output block data and the ith layer recomputing features, wherein i is one of a plurality of positive integers from 1 to the depth;

performing a second direction data selecting step to select a plurality of ith layer reusing features according to the ith layer recomputing input feature block data along a block scanning direction, and then combine the ith layer recomputing input feature block data with the ith layer reusing features to generate an ith layer reusing input feature block data; and performing a convolution operation step to select a plurality of ith layer sub-block input feature groups from the ith layer reusing input feature block data according to an ith layer kernel size, and then execute a convolution operation on each of the ith layer sub-block input feature groups and a convolution parameter group to generate each of a plurality of ith layer sub-block output features, and combine the ith layer sub-block output features corresponding to the ith layer sub-block input feature groups to form an ith layer output feature block data; and performing a temporary storing step to drive a block buffer bank to store the ith layer output feature block data and the ith layer reusing features;

wherein in response to determining that at least one of a plurality of input features of one of the ith layer sub-block input feature groups is located in an outer region of the ith layer reusing input feature block data, the input features of the one of the ith layer sub-block input feature groups comprise a plurality of outer block features and a plurality of first inner block features, the outer block features represent the input features that have been calculated, and the first inner block features represent the input features that have not been calculated;

in response to determining that the input features of the one of the ith layer sub-block input feature groups are all located in an inner region of the ith layer reusing input feature block data, the input features of the one of the ith layer sub-block input feature groups only comprise a plurality of second inner block features, and the second inner block features represent the input features that have not been calculated;

the ith layer reusing input feature block data has the outer region and the inner region in sequence along the block scanning direction; and the outer block features are stored in the block buffer bank, the block buffer bank has a temporary storage space, the temporary storage space is calculated according to a width of the ith layer recomputing input feature block data, the depth, a layer number, a channel number and the ith layer kernel size, the width of the ith layer recomputing input feature block data is represented as $B_{Wi}$, the depth is represented as D, the layer number is represented as i, the channel number is represented as $C_i$, the ith layer kernel size is $k_{Wi} \times k_{Hi}$, and the temporary storage space is represented as LBS and described as follows:

$$LBS = \Sigma_{i=1}^{D}(k_{Hi}-1) \cdot B_{Wi} \cdot C_i.$$

2. The block-based inference method for the memory-efficient convolutional neural network implementation of claim 1, wherein, in response to determining that i is equal to 1, the ith layer recomputing input feature block data is equal to each of the input block data; and in response to determining that i is equal to the depth, the ith layer output feature block data is equal to the output block data.

3. The block-based inference method for the memory-efficient convolutional neural network implementation of claim 1, wherein the ith layer reusing input feature block data has an ith layer reusing input feature block size and an ith layer reusing input feature block channel number, the ith layer output feature block data has an ith layer output feature block size and an ith layer output feature block channel number, the ith layer output feature block size is greater than the ith layer reusing input feature block size, and the ith layer reusing input feature block channel number is equal to the ith layer output feature block channel number.

4. The block-based inference method for the memory-efficient convolutional neural network implementation of claim 1, wherein the block scanning direction is perpendicular to the scanning line feed direction, the block width is greater than the block height, and an extending direction of the block height is parallel to the block scanning direction.

5. The block-based inference method for the memory-efficient convolutional neural network implementation of claim 1, wherein the depth, the block width and the block height are all positive integers, the ith layer kernel size is $k_{Wi} \times k_{Hi}$, the ith layer reusing features have a reusing feature number along the block scanning direction, and the reusing feature number is equal to $k_{Hi}-1$.

6. The block-based inference method for the memory-efficient convolutional neural network implementation of claim 1, wherein the block width is represented as $B_W$, the depth is represented as D, and the block height is represented as $B_H$;

the input block size is equal to $B_W \times B_H$;
the output block data has an output block size, and the output block size is equal to $(B_W-2D) \times B_H$;
the ith layer recomputing input feature block data has an ith layer recomputing input feature block size, and the ith layer recomputing input feature block size is equal to $(B_W-2i+2) \times B_H$;
the ith layer reusing input feature block data has an ith layer reusing input feature block size, and the ith layer reusing input feature block size is equal to $(B_W-2i+2) \times (B_H+2)$;
the ith layer output feature block data has an ith layer output feature block size, and the ith layer output feature block size is equal to $(B_W-2i) \times B_H$; and
the depth is less than a half of the block width.

7. A block-based inference system for a memory-efficient convolutional neural network implementation, which is configured to process an input image, and the block-based inference system for the memory-efficient convolutional neural network implementation comprising:

a block buffer bank configured to store an ith layer output feature block data and a plurality of ith layer reusing features; and
a processing unit electrically connected to the block buffer bank, wherein the processing unit receives the input image and is configured to implement a block-based inference method for the memory-efficient convolutional neural network implementation comprising:
performing a parameter setting step to set an inference parameter group, wherein the inference parameter group comprises a depth, a block width, a block height and a plurality of layer kernel sizes;
performing a dividing step to divide the input image into a plurality of input block data according to the depth, the block width, the block height and the layer kernel sizes, wherein each of the input block data has an input block size; and
performing a block-based inference step to execute a multi-layer convolution operation on each of the input block data to generate an output block data, wherein the multi-layer convolution operation comprises:
performing a first direction data selecting step to select a plurality of ith layer recomputing features according to a position of the output block data along a scanning line feed direction, and then select an ith layer recomputing input feature block data according to the position of the output block data and the ith layer recomputing features, wherein i is one of a plurality of positive integers from 1 to the depth;
performing a second direction data selecting step to select the ith layer reusing features according to the ith layer recomputing input feature block data along a block scanning direction, and then combine the ith layer recomputing input feature block data with the ith layer reusing features to generate an ith layer reusing input feature block data; and
performing a convolution operation step to select a plurality of ith layer sub-block input feature groups from the ith layer reusing input feature block data according to an ith layer kernel size, and then execute a convolution operation on each of the ith layer sub-block input feature groups and a convolution parameter group to generate each of a plurality of ith layer sub-block output features, and combine the ith layer sub-block output features corresponding to the ith layer sub-block input feature groups to form the ith layer output feature block data;
wherein in response to determining that at least one of a plurality of input features of one of the ith layer sub-block input feature groups is located in an outer region of the ith layer reusing input feature block data, the input features of the one of the ith layer sub-block input feature groups comprise a plurality of outer block features and a plurality of first inner block features, the outer block features represent the input features that have been calculated, and the first inner block features represent the input features that have not been calculated;
in response to determining that the input features of the one of the ith layer sub-block input feature groups are all located in an inner region of the ith layer reusing input feature block data, the input features of the one of the ith layer sub-block input feature groups only comprise a plurality of second inner block features, and the second inner block features represent the input features that have not been calculated;
the ith layer reusing input feature block data has the outer region and the inner region in sequence along the block scanning direction; and
the outer block features are stored in the block buffer bank, the block buffer bank has a temporary storage space, the temporary storage space is calculated according to a width of the ith layer recomputing input feature block data, the depth, a layer number, a channel number and the ith layer kernel size, the width of the ith layer recomputing input feature block data is represented as $B_{Wi}$, the depth is represented as D, the layer number is represented as i, the channel number is represented as $C_i$, the ith layer kernel size is $k_{Wi} \times k_{Hi}$, and the temporary storage space is represented as LBS and described as follows:

$$LBS = \sum_{j=1}^{D}(k_{Hi}-1) \cdot B_{Wi} \cdot C_i.$$

8. The block-based inference system for the memory-efficient convolutional neural network implementation of claim 7, wherein,
   in response to determining that i is equal to 1, the ith layer recomputing input feature block data is equal to each of the input block data; and
   in response to determining that i is equal to the depth, the ith layer output feature block data is equal to the output block data.

9. The block-based inference system for the memory-efficient convolutional neural network implementation of claim 7, wherein the ith layer reusing input feature block data has an ith layer reusing input feature block size and an ith layer reusing input feature block channel number, the ith layer output feature block data has an ith layer output feature block size and an ith layer output feature block channel number, the ith layer output feature block size is greater than the ith layer reusing input feature block size, and the ith layer reusing input feature block channel number is equal to the ith layer output feature block channel number.

10. The block-based inference system for the memory-efficient convolutional neural network implementation of claim 7, wherein the block scanning direction is perpendicular to the scanning line feed direction, the block width is greater than the block height, and an extending direction of the block height is parallel to the block scanning direction.

11. The block-based inference system for the memory-efficient convolutional neural network implementation of claim 7, wherein the depth, the block width and the block height are all positive integers, the ith layer kernel size is $k_{Wi} \times k_{Hi}$, the ith layer reusing features have a reusing feature number along the block scanning direction, and the reusing feature number is equal to $k_{Hi}-1$.

12. The block-based inference system for the memory-efficient convolutional neural network implementation of claim 7, wherein the block width is represented as $B_W$, the depth is represented as D, and the block height is represented as $B_H$;
   the input block size is equal to $B_W \times B_H$;
   the output block data has an output block size, and the output block size is equal to $(B_W-2D) \times B_H$;
   the ith layer recomputing input feature block data has an ith layer recomputing input feature block size, and the ith layer recomputing input feature block size is equal to $(B_W-2i+2) \times B_H$;
   the ith layer reusing input feature block data has an ith layer reusing input feature block size, and the ith layer reusing input feature block size is equal to $(B_W-2i+2) \times (B_H+2)$;
   the ith layer output feature block data has an ith layer output feature block size, and the ith layer output feature block size is equal to $(B_W-2i) \times B_H$; and
   the depth is less than a half of the block width.

* * * * *